United States Patent
Nomura et al.

(10) Patent No.: US 8,840,510 B2
(45) Date of Patent: Sep. 23, 2014

(54) SPEED REDUCTION MECHANISM AND MOTOR TORQUE TRANSMISSION DEVICE INCLUDING THE SPEED REDUCTION MECHANISM

(75) Inventors: Keita Nomura, Kariya (JP); Kunihiko Suzuki, Gamagori (JP); Tomoyoshi Takai, Kariya (JP)

(73) Assignee: JTEKT Corporation, Osaka-shi (JP)

( * ) Notice: Subject to any disclaimer, the term of this patent is extended or adjusted under 35 U.S.C. 154(b) by 178 days.

(21) Appl. No.: 13/525,961

(22) Filed: Jun. 18, 2012

(65) Prior Publication Data

US 2012/0329596 A1 Dec. 27, 2012

(30) Foreign Application Priority Data

Jun. 24, 2011 (JP) .................................. 2011-140612

(51) Int. Cl.
- *F16H 57/04* (2010.01)
- *B60L 11/14* (2006.01)
- *B60K 17/356* (2006.01)
- *F16H 1/32* (2006.01)
- *B60K 1/00* (2006.01)

(52) U.S. Cl.
CPC ......... *B60K 17/356* (2013.01); *B60L 2240/486* (2013.01); *B60L 11/14* (2013.01); *F16H 2001/323* (2013.01); *F16H 1/32* (2013.01); *F16H 57/0428* (2013.01); *F16H 57/0434* (2013.01); *B60K 2001/001* (2013.01); *Y02T 10/7077* (2013.01); *F16H 57/0486* (2013.01); *F16H 57/0483* (2013.01); *B60L 2260/28* (2013.01)
USPC .......................................... 475/159; 184/6.12

(58) Field of Classification Search
USPC .......................................... 475/159; 184/6.12
See application file for complete search history.

(56) References Cited

U.S. PATENT DOCUMENTS

| | | | | |
|---|---|---|---|---|
| 2,966,078 | A | * | 12/1960 | Wright .......................... 475/149 |
| 3,430,523 | A | * | 3/1969 | Merritt .......................... 475/159 |
| 4,760,759 | A | * | 8/1988 | Blake .............................. 475/159 |
| 2010/0319569 | A1 | * | 12/2010 | Miki et al. ..................... 105/108 |

(Continued)

FOREIGN PATENT DOCUMENTS

| | | |
|---|---|---|
| JP | 9-53707 | 2/1997 |
| JP | 2007-218407 | 8/2007 |

(Continued)

OTHER PUBLICATIONS

Machine translation of IDS art JP 2009287634A dated Feb. 9, 2014.*

(Continued)

*Primary Examiner* — Tisha Lewis
(74) *Attorney, Agent, or Firm* — Oblon, Spivak, McClelland, Maier & Neustadt, L.L.P.

(57) ABSTRACT

A speed reduction mechanism includes: a speed reduction unit that includes an input member formed of an external gear that makes circular motion about a rotation axis with an eccentric amount, and a rotation force applying member formed of an internal gear that is in mesh with the input member; and a lubricating oil supply unit that supplies lubricating oil to a bearing of the speed reduction unit. The lubricating oil supply unit includes an oil tank arranged outside of the rotation force applying member, an oil delivery passage that delivers the lubricating oil to the oil tank, and a first oil introduction passage that introduces the lubricating oil from the oil tank to the bearing. The lubricating oil is delivered to the oil delivery passage through pumping action of the input member based on the circular motion.

6 Claims, 4 Drawing Sheets

(56) References Cited

U.S. PATENT DOCUMENTS

| | | |
|---|---|---|
| 2010/0320849 A1 | 12/2010 | Wilton et al. |
| 2011/0082000 A1* | 4/2011 | Makino .......... 475/149 |
| 2012/0258834 A1* | 10/2012 | Winiasz et al. .......... 475/159 |

FOREIGN PATENT DOCUMENTS

| | | |
|---|---|---|
| JP | 2009-287634 | 12/2009 |
| JP | 2011-38575 | 2/2011 |
| JP | 2011-64304 | 3/2011 |

OTHER PUBLICATIONS

U.S. Appl. No. 13/525,547, filed Jun. 18, 2012, Nomura, et al.
Extended Search Report issued Feb. 25, 2013 in European Application No. 12172996.6.
U.S. Appl. No. 13/692,130, filed Dec. 3, 2012, Suzuki et al.

* cited by examiner

SPEED REDUCTION MECHANISM AND MOTOR TORQUE TRANSMISSION DEVICE INCLUDING THE SPEED REDUCTION MECHANISM

INCORPORATION BY REFERENCE

The disclosure of Japanese Patent Application No. 2011-140612 filed on Jun. 24, 2011 including the specification, drawings and abstract, is incorporated herein by reference in its entirety.

BACKGROUND OF THE INVENTION

1. Field of the Invention

The invention relates to a speed reduction mechanism that is suitably used in, for example, an electric vehicle that has an electric motor serving as a driving source, and a motor torque transmission device that includes the speed reduction mechanism.

2. Description of Related Art

There is a conventional motor torque transmission device that is mounted in an automobile, and that includes an electric motor that generates motor torque and a reduction-transmission mechanism that reduces the speed of rotation output from the electric motor and transmits driving force to a differential mechanism (for example, see Japanese Patent Application Publication No. 2007-218407 (JP 2007-218407 A).

The electric motor has a motor shaft that is rotated by electric power from an in-vehicle battery. The motor shaft is arranged along the axis of the reduction-transmission mechanism. Eccentric portions are integrally formed on the outer periphery of the motor shaft. The central axis of each eccentric portion is an axis that is offset from the axis of the motor shaft by a predetermined eccentric amount.

The reduction-transmission mechanism has a pair of reduction-transmission units provided around the axis of the reduction-transmission mechanism, and a housing that accommodates the reduction-transmission units. The reduction-transmission mechanism is interposed between the electric motor and the differential mechanism, and is coupled to the motor shaft and the differential mechanism (differential case). One of the reduction-transmission units is coupled to the motor shaft, and the other one of the reduction-transmission units is coupled to the differential case.

With the above configuration, the motor shaft of the electric motor is rotated by electric power from the in-vehicle battery, and accordingly the motor torque is transmitted from the electric motor to the differential mechanism via the reduction-transmission mechanism and then distributed to right and left wheels by the differential mechanism.

The reduction-transmission units of the motor torque transmission device of this type have a pair of disc-shaped revolving members, a plurality of outer pins and a plurality of inner pins. The revolving members make revolving motions in accordance with the rotation of the motor shaft of the electric motor. The outer pins apply rotation force to the revolving members. The inner pins are arranged radially inward of the outer pins, and output the rotation force of the revolving members to the differential mechanism as driving force (torque), and the driving force is transmitted to a rotation member at wheel side.

The revolving members each have a center hole and a plurality of pin insertion holes. The revolving members are rotatably supported by the eccentric portions of the motor shaft via bearings (cam-side bearings). The central axis of each center hole coincides with the axis of a corresponding one of the eccentric portions of the motor shaft. The pin insertion holes are arranged at equal intervals around the central axis of each center hole.

The outer pins are arranged at equal intervals around the axis of the motor shaft, and are fitted to the housing of the reduction-transmission mechanism.

The inner pins are passed through the pin insertion holes of the revolving members. The inner pins are arranged at equal intervals on a circle around the axis of the rotation member at wheel side, and are fitted to the differential case. Bearings (pin-side bearings) are fitted to the inner pins. The bearings are used to reduce contact resistance between the inner pins and the inner peripheries which define the pin insertion holes of the revolving members.

However, in the motor torque transmission device described in JP 2007-218407 A, lubricating oil is concentrated on the outer side in the radial direction of the motor shaft by centrifugal force resulting from the revolving motions of the revolving members. This may cause a problem that an amount of lubricating oil near the motor shaft reduces and the lubricating oil is not sufficiently supplied to the bearings located on the inner side in the radial direction of the motor shaft.

SUMMARY OF THE INVENTION

It is an object of the invention to provide a speed reduction mechanism in which an amount of lubricating oil on the inner side in the radial direction perpendicular to the rotation axis is increased to sufficiently supply the lubricating oil to a bearing near the rotation axis, and a motor torque transmission device that includes the speed reduction mechanism.

An aspect of the invention relates to a speed reduction mechanism that includes: a speed reduction unit that includes an input member formed of an external gear that makes circular motion about a rotation axis with a predetermined eccentric amount, and a rotation force applying member formed of an internal gear that has teeth the number of which is larger than the number of teeth of the input member and that is in mesh with the input member; and a lubricating oil supply unit that supplies lubricating oil to a bearing of the speed reduction unit. The lubricating oil supply unit includes an oil tank arranged outside of the rotation force applying member, an oil delivery passage that delivers the lubricating oil from a space, formed between the input member and the rotation force applying member, to the oil tank, and a first oil introduction passage that introduces the lubricating oil from the oil tank to the bearing. The lubricating oil is delivered from the space to the oil delivery passage through pumping action of the input member based on the circular motion.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a motor torque transmission device according to an embodiment of the invention will be described in detail with reference to the accompanying drawings.

Figure 1:
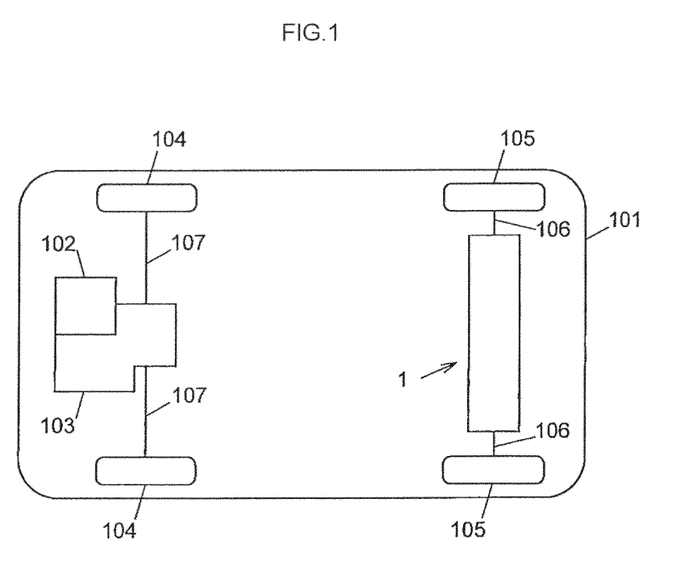
FIG. 1 is a plan view schematically illustrating a vehicle in which a motor torque transmission device according to an embodiment of the invention is mounted.

FIG. 1 schematically shows a four-wheel drive vehicle 101. As shown in FIG. 1, the four-wheel drive vehicle 101 has a front wheel power system that uses an engine 102 as a driving source, and a rear wheel power system that uses an electric motor 4 (described later in detail) as a driving source. The four-wheel drive vehicle 101 includes a motor torque transmission device 1, the engine 102, a transaxle 103, a pair of front wheels 104 and a pair of rear wheels 105.

The motor torque transmission device 1 is arranged in the rear wheel power system of the four-wheel drive vehicle 101, and is supported by a vehicle body (not shown) of the four-wheel drive vehicle 101.

The motor torque transmission device 1 is configured to transmit driving force based on the motor torque of the electric motor 4 to the rear wheels 105. Thus, the motor torque of the electric motor 4 is output to rear axle shafts 106 via a reduction-transmission mechanism 5 and a rear differential 3 (both will be described later in detail) to drive the rear wheels 105. The details of the motor torque transmission device 1, and the like, will be described later.

The engine 102 is arranged in the front wheel power system of the four-wheel drive vehicle 101. Thus, the driving force of the engine 102 is output to front axle shafts 107 via the transaxle 103 to drive the front wheels 104.

Figure 2:
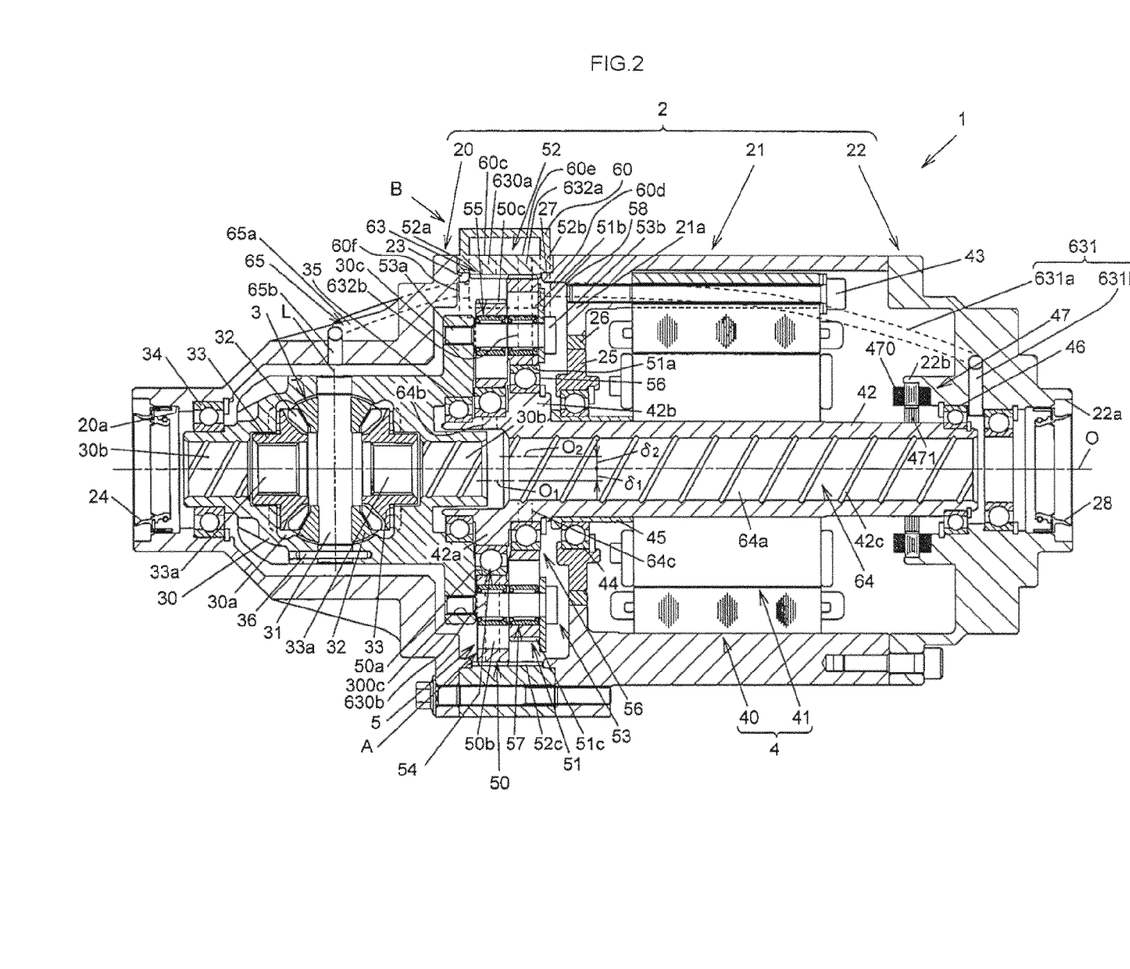
FIG. 2 is a sectional view illustrating the motor torque transmission device according to the embodiment of the invention.

FIG. 2 is an overall view of the motor torque transmission device. As shown in FIG. 2, the motor torque transmission device 1 is formed mainly of a housing 2, the rear differential 3, the electric motor 4 and the reduction-transmission mechanism 5. The axis of the housing 2 is a rotation axis O that coincides with the axis of each rear axle shaft 106 (shown in FIG. 1). The rear differential 3 is a driving force transmission target (i.e., a member to which driving force is transmitted) that distributes driving force based on the motor torque to the rear wheels 105 (shown in FIG. 1). The electric motor 4 generates motor torque for driving the rear differential 3. The reduction-transmission mechanism 5 reduces the speed of rotation output from the electric motor 4 and transmits driving force to the rear differential 3.

The housing 2 has a rotation force applying member 52 (described later in detail), a first housing element 20, a second housing element 21 and a third housing element 22. The housing 2 is arranged on the vehicle body. The first housing element 20 accommodates the rear differential 3. The second housing element 21 accommodates the electric motor 4. The third housing element 22 closes a first opening portion of the second housing element 21 (an opening portion on the opposite side of the second housing element 21 from a first housing element 20-side opening portion (second opening portion)).

The first housing element 20 is arranged at a second side (left side in FIG. 2) of the housing 2. The entirety of the first housing element 20 is formed of a stepped closed-end cylindrical member that is open toward the second housing element 21. The bottom of the first housing element 20 has a shaft insertion hole 20a through which one of the rear axle shafts 106 (shown in FIG. 1) is passed. An annular protrusion 23 that protrudes toward the second housing element 21 is formed integrally on the open end face of the first housing element 20. The outer periphery of the protrusion 23 has an outside diameter smaller than the maximum outside diameter of the first housing element 20, and is formed of a cylindrical surface of which the central axis coincides with the rotation axis O. A seal member 24 is interposed between the inner periphery of the first housing element 20 and the outer periphery of the rear axle shaft 106. The seal member 24 seals the shaft insertion hole 20a.

The second housing element 21 is arranged at the middle of the housing 2 in the axial direction. The entirety of the second housing element 21 is formed of an open-end cylindrical member that is open toward both sides in the direction of the rotation axis O. A stepped inward flange 21a, which is interposed between the electric motor 4 and the reduction-transmission mechanism 5, is formed integrally with the second opening portion of the second housing element 21 (the opening portion on the first housing element 20-side). An annular member 25, to which a race is fitted, is fitted to the inner periphery of the inward flange 21a via an annular spacer 26. An annular protrusion 27, which protrudes toward the first housing element 20, is formed integrally on the second open end face of the second housing element 21 (the open end face on the first housing element 20-side). The outer periphery of the protrusion 27 has an outside diameter smaller than the maximum outside diameter of the second housing element 21. The protrusion 27 has substantially the same outside diameter as the outside diameter of the protrusion 23. The outer periphery of the protrusion 27 is formed of a cylindrical surface of which the central axis coincides with the rotation axis O.

The third housing element 22 is arranged at the first side (right side in FIG. 2) of the housing 2. The entirety of the third housing element 22 is formed of a stepped closed-end cylindrical member that is open toward the second housing element 21. The bottom of the third housing element 22 has a shaft insertion hole 22a through which the other one of the rear axle shafts 106 is passed. A cylindrical portion 22b, which protrudes toward the electric motor 4 and to which a stator is fitted, is formed integrally with the third housing element 22 so as to surround the inner opening of the shaft insertion hole 22a. A seal member 28 that seals the shaft insertion hole 22a is interposed between the inner periphery of the third housing element 22 and the outer periphery of the rear axle shaft 106.

The rear differential 3 is formed of a bevel gear differential mechanism that includes a differential case 30, a pinion gear shaft 31, a pair of pinion gears 32 and a pair of side gears 33. The rear differential 3 is arranged at the second side of the motor torque transmission device 1.

Thus, the torque of the differential case 30 is distributed from the pinion gear shaft 31 to the side gears 33 via the pinion gears 32, and further transmitted from the rear axle shafts 106 (shown in FIG. 1) to the right and left rear wheels 105 (shown in FIG. 1).

When there arises a difference in driving resistance between the right and left rear wheels 105, the torque of the differential case 30 is differentially distributed to the right and left rear wheels 105 by the rotations of the pinion gears 32.

The differential case 30 is arranged on the rotation axis O. The differential case 30 is rotatably supported by the first housing element 20 via a ball bearing 34, and is rotatably supported by a motor shaft (rotary shaft) 42 of the electric motor 4 via a ball bearing 35. The differential case 30 is configured to rotate about the rotation axis O upon reception of driving force based on the motor torque of the electric motor 4 from the reduction-transmission mechanism 5.

The differential case 30 has an accommodation space 30a and a pair of shaft insertion holes 30b. A differential mechanism unit (the pinion gear shaft 31, the pinion gears 32 and the side gears 33) is accommodated in the accommodation space 30a. The shaft insertion holes 30b communicate with the accommodation space 30a, and the right and left rear axle shafts 106 are passed through the shaft insertion holes 30b.

An annular flange 30c that faces the reduction-transmission mechanism 5 is formed integrally with the differential case 30. The flange 30c has a plurality of (six in the present embodiment) pin fitting holes 300c that are arranged at equal intervals around the rotation axis O.

The pinion gear shaft 31 is arranged along an axis L perpendicular to the rotation axis O in the accommodation space 30a of the differential case 30. Rotation of the pinion gear shaft 31 about the axis L and movement of the pinion gear shaft 31 in the direction of the axis L are restricted by a pin 36.

The pinion gears 32 are rotatably supported by the pinion gear shaft 31, and are accommodated in the accommodation space 30a of the differential case 30.

The side gears 33 each have a shaft coupling hole 33a in which a corresponding one of the rear axle shafts 106 (shown in FIG. 1) is spline-coupled. The side gears 33 are accommodated in the accommodation space 30a of the differential case 30. The side gears 33 are configured such that the gear axes are perpendicular to the gear axes of the pinion gears 32 and the side gears 33 are in mesh with the pinion gears 32.

The electric motor 4 includes a stator 40, a rotor 41 and the motor shaft 42, and is coupled, on the rotation axis O, to the rear differential 3 via the reduction-transmission mechanism 5. The stator 40 is connected to an electronic control unit (ECU) (not shown). The electric motor 4 is configured such that the stator 40 receives a control signal from the ECU, motor torque for driving the rear differential 3 is generated with the use to the stator 40 and the rotor 41, and the rotor 41 is rotated together with the motor shaft 42.

The stator 40 is arranged at the outer peripheral side of the electric motor 4, and is fitted to the inward flange 21a of the second housing element 21 with a fitting bolt 43.

The rotor 41 is arranged at the inner peripheral side of the electric motor 4, and is fitted to the outer periphery of the motor shaft 42.

The motor shaft 42 is arranged on the rotation axis O. In addition, the second end portion of the motor shaft 42 is rotatably supported by the inner periphery of the annular member 25 via a ball bearing 44 and a sleeve 45, and the first end portion of the motor shaft 42 is rotatably supported by the inner periphery of the third housing element 22 via a ball bearing 46. The entirety of the motor shaft 42 is formed of a cylindrical (hollow) shaft member through which the rear axle shafts 106 (shown in FIG. 1) is passed.

An eccentric portion 42a and an eccentric portion 42b, both of which are circular in planar view, are formed integrally with the second end portion of the motor shaft 42. The central axis of the eccentric portion 42a is an axis $O_1$ that is offset from the axis of the motor shaft 42 (rotation axis O) by an eccentric amount $\delta_1$. The central axis of the eccentric portion 42b is an axis $O_2$ that is offset from the rotation axis O by an eccentric amount $\delta_2$ ($\delta_1=\delta_2=\delta$). The eccentric portion 42a and the eccentric portion 42b are arranged so as to be next to each other along the rotation axis O and apart from each other in the circumferential direction around the rotation axis O at equal intervals) (180°). That is, the eccentric portion 42a and the eccentric portion 42b are arranged on the outer periphery of the motor shaft 42 such that the distance from the axis $O_1$ to the rotation axis O and the distance from the axis $O_2$ to the rotation axis O are equal to each other and the distance between the axis $O_1$ and the axis $O_2$ in one of the circumferential directions around the rotation axis O and the distance between the axis $O_2$ and the axis $O_1$ in the other circumferential direction around the rotation axis O are equal to each other.

A resolver 47 is arranged at the first end portion of the motor shaft 42. The resolver 47 serves as a rotation angle detector, and is interposed between the outer periphery of the motor shaft 42 and the inner periphery of the cylindrical portion 22b. The resolver 47 has a stator 470 and a rotor 471, and is accommodated inside the third housing element 22. The stator 470 is fitted to the inner periphery of the cylindrical portion 22b. The rotor 471 is fitted to the outer periphery of the motor shaft 42.

A spiral groove 42c is formed in the inner periphery of the motor shaft 42. Through the groove 42c, lubricating oil is supplied from the first opening portion on the resolver 47-side (right side in FIG. 2) to the second opening portion on the rear differential 3-side (left side in FIG. 2) as the motor shaft 42 rotates.

Figure 3:
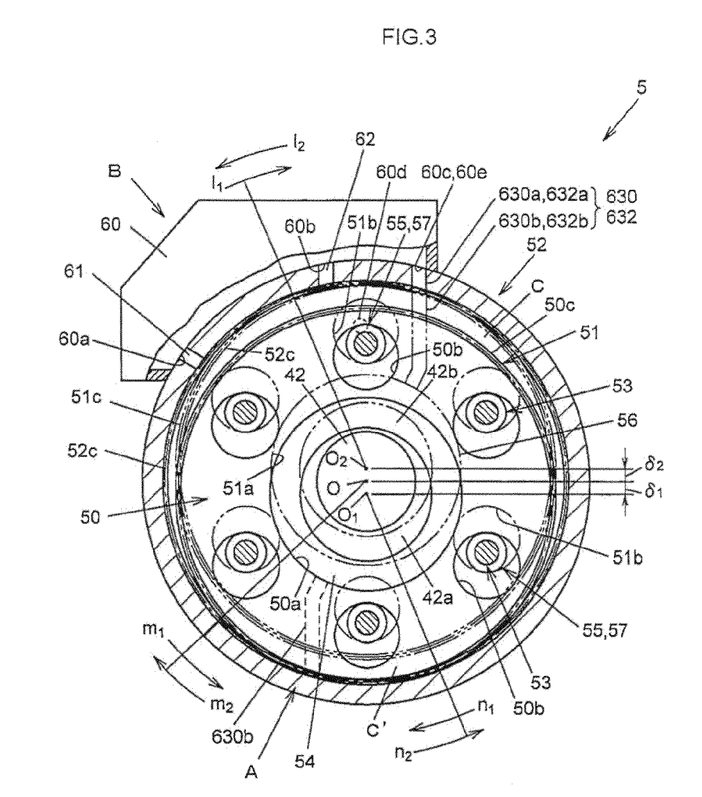
FIG. 3 is a sectional view schematically illustrating main portions of a reduction-transmission mechanism of the motor torque transmission device according to the embodiment of the invention.
Figure 4:
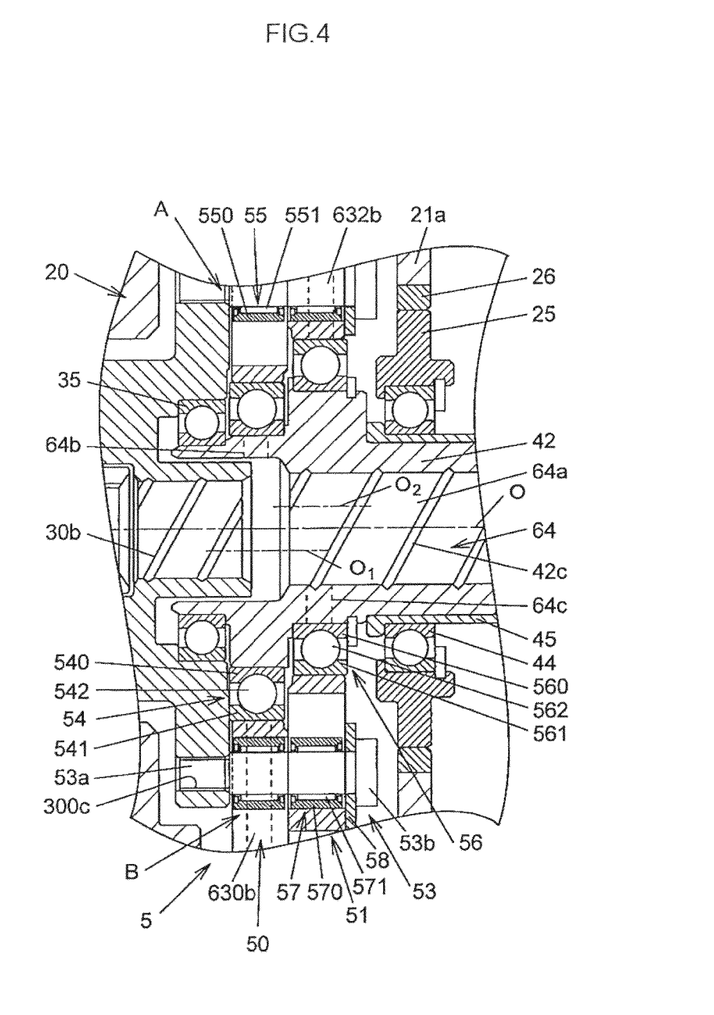
FIG. 4 is a sectional view that shows oil supply passages to bearings of the reduction-transmission mechanism in the motor torque transmission device according to the embodiment of the invention.

FIG. 3 shows the reduction-transmission mechanism. FIG. 4 shows oil supply passages. As shown in FIG. 2 and FIG. 3, the reduction-transmission mechanism 5 includes a speed reduction unit A and a lubricating oil supply unit B. The reduction-transmission mechanism 5 is interposed between the rear differential 3 and the electric motor 4.

The speed reduction unit A has a pair of input members 50, 51, the rotation force applying member 52 and output members 53. The speed reduction unit A is configured to reduce the speed of rotation output from the electric motor 4 and output driving force to the rear differential 3.

The input member 50 is formed of an external gear that has a center hole 50a of which the central axis coincides with the axis $O_1$. The input member 50 is arranged so as to be closer to the rear differential 3 than the input member 51. In addition, the input member 50 is rotatably supported by the motor shaft 42 via a ball bearing 54. The ball bearing 54 serves as a first bearing (input-side bearing), and is interposed between the inner periphery of the input member 50, which defines the center hole 50a, and the eccentric portion 42a. The input member 50 is configured to make circular motion (revolving motion about the rotation axis O) in the directions of the arrows $m_1$, $m_2$ with the eccentric amount $\delta$, upon reception of motor torque from the electric motor 4. The ball bearing 54 includes two races 540, 541 (an inner ring 540 and an outer ring 541) and rolling elements 542. The inner ring 540 is arranged radially inward of the outer ring 541. The rolling elements 542 roll between the inner ring 540 and the outer ring 541.

The input member 50 has a plurality of (six in the present embodiment) pin insertion holes (through-holes) 50b that are arranged at equal intervals around the axis $O_1$. The hole diameter of each pin insertion hole 50b is set to a value that is larger than a value obtained by adding the outside diameter of a needle roller bearing 55, which serves as a second bearing, to the outside diameter of each output member 53. External teeth 50c, having an involute tooth profile, are formed on the outer periphery of the input member 50, of which the central axis coincides with the axis $O_1$. The number $Z_1$ of the external teeth 50c is set to 195 ($Z_1=195$), for example. The outside diameter of each needle roller bearing 55 is set to a value that is smaller than the outside diameter of the ball bearing 54.

The input member 51 is formed of an external gear that has a center hole 51a of which the central axis coincides with the axis $O_2$. The input member 51 is arranged so as to be closer to the electric motor 4 than the input member 50. In addition, the input member 51 is rotatably supported by the motor shaft 42 via a ball bearing 56. The ball bearing 56 serves as the first bearing (input-side bearing), and is interposed between the inner periphery of the second input member 51, which defines the center hole 51a, and the eccentric portion 42b. The input member 51 is configured to make circular motion (revolving motion about the rotation axis O) in the directions of the arrows $m_1$, $m_2$ with the eccentric amount δ, upon reception of motor torque from the electric motor 4. The ball bearing 56 includes two races 560, 561 (an inner ring 560 and an outer ring 561) and rolling elements 562. The inner ring 560 is arranged radially inward of the outer ring 561. The rolling elements 562 roll between the inner ring 560 and the outer ring 561.

The input member 51 has a plurality of (six in the present embodiment) pin insertion holes (through-holes) 51b that are arranged at equal intervals around the axis $O_2$. The hole diameter of each pin insertion hole 51b is set to a value that is larger than a value obtained by adding the outside diameter of a needle roller bearing 57, which serves as the second bearing, to the outside diameter of each output member 53. External teeth 51c, having an involute tooth profile, are formed on the outer periphery of the input member 51 of which the central axis coincides with the axis $O_2$. The number $Z_2$ ($Z_2=Z_1$) of the external teeth 51c is set to 195, for example. The outside diameter of each needle roller bearing 57 is set to a value that is smaller than the outside diameter of the ball bearing 56.

The rotation force applying member 52 is formed of an internal gear of which the central axis coincides with the rotation axis O. The rotation force applying member 52 is interposed between the first housing element 20 and the second housing element 21. The entirety of the rotation force applying member 52 is formed of an open-end cylindrical member that constitutes part of the housing 2 and that is open toward both sides in the direction of the rotation axis O. The rotation force applying member 52 is in mesh with the input members 50, 51. The rotation force applying member 52 is configured to apply rotation force in the direction of the arrow $n_1$ to the input member 50 that makes revolving motion upon reception of motor torque from the electric motor 4, and to apply rotation force in the direction of the arrow $1_1$ to the input member 51 that makes revolving motion upon reception of motor torque from the electric motor 4.

The inner periphery of the rotation force applying member 52 has a first fitting portion 52a and a second fitting portion 52b that are located at a predetermined distance in the direction of the rotation axis O. The first fitting portion 52a is fitted to the outer periphery of the protrusion 23. The second fitting portion 52b is fitted to the outer periphery of the protrusion 27. In addition, the inner periphery of the rotation force applying member 52 has internal teeth 52c having an involute tooth profile. The internal teeth 52c are located between the first fitting portion 52a and the second fitting portion 52b. The external teeth 50c of the input member 50 and the external teeth 51c of the input member 51 are in mesh with the internal teeth 52c. The number $Z_3$ of the internal teeth 52c is set to 208, for example. Thus, the reduction gear ratio α of the reduction-transmission mechanism 5 is calculated according to an equation, $\alpha=Z_2/(Z_3-Z_2)$.

The output members 53 are a plurality of (six in the present embodiment) bolts each having a threaded portion 53a at one end and a head 53b at the other end. The threaded portions 53a of the output members 53 are passed through the pin insertion holes 50b of the input member 50 and the pin insertion holes 51b of the input member 51 and then fitted in the pin fitting holes 300c of the differential case 30. In addition, the output members 53 are arranged so as to be passed through an annular spacer 58 that is interposed between each head 53b and the input member 51. The output members 53 are configured to receive rotation force, applied by the rotation force applying member 52, from the input members 50, 51 and output the rotation force to the differential case 30 as the torque of the differential case 30.

The needle roller bearing 55 is fitted to the outer periphery of each output member 53 at a portion between the threaded portion 53a and the head 53b. The needle roller bearing 55 is used to reduce contact resistance between each output member 53 and the inner periphery, which defines the corresponding pin insertion hole 50b of the input member 50. In addition, the needle roller bearing 57 is fitted to the outer periphery of each output member 53 at a portion between the threaded portion 53a and the head 53b. The needle roller bearing 57 is used to reduce contact resistance between each output member 53 and the inner periphery, which defines the corresponding pin insertion hole 51b of the input member 51.

The needle roller bearings 55 each have a race 550 and needle rollers 551. The race 550 is able to contact the inner periphery, which defines a corresponding one of the pin insertion holes 50b of the input member 50. The needle rollers 551 roll between the race 550 and the outer periphery of a corresponding one of the output members 53. The needle roller bearings 57 each have a race 570 and needle rollers 571. The race 570 is able to contact the inner periphery, which defines a corresponding one of the pin insertion holes 51b of the input member 51. The needle rollers 571 roll between the race 570 and the outer periphery of a corresponding one of the output members 53.

The lubricating oil supply unit B includes an oil tank 60, oil delivery passages 61, 62, an oil introduction passage 63 and oil supply passages 64, 65. The housing 2 is provided with the lubricating oil supply unit B. The lubricating oil supply unit B is configured such that the lubricating oil is delivered from spaces C, C' (described later in detail) to the oil delivery passages 61, 62 through pumping action based on the circular motions of the input members 50, 51, then introduced from the oil delivery passages 61, 62 to the oil tank 60 and stored in the oil tank 60, and further introduced from the oil tank 60 to the oil introduction passage 63 (a first oil introduction passage 630 and a third oil introduction passage 632) to be supplied to the bearings (for example, the ball bearings 54, 56) of the speed reduction unit A. The bearings of the speed reduction unit A are also supplied with the lubricating oil from the oil tank 60 via the oil introduction passage 63 (a second oil introduction passage 631) and the oil supply passage 64. The lubricating oil supply unit B is configured to supply the lubricating oil from the oil tank 60 to the rear differential 3 via the oil supply passage 65.

The oil tank 60 has oil inlet ports 60a, 60b and oil outlet ports 60c to 60f, and is arranged outside the rotation force applying member 52. The oil tank 60 is configured to store the lubricating oil introduced therein from the oil delivery passages 61, 62 via the oil inlet ports 60a, 60b and to deliver the lubricating oil to the oil introduction passage 63 (the first oil introduction passage 630 to the third oil introduction passage 632) via the oil outlet ports 60c to 60e and also to the oil supply passage 65 via the oil outlet port 60f.

The oil delivery passage 61 functions as an oil passage that extends from the space C, formed between the input member 50 and the rotation force applying member 52, to the oil tank 60, and is formed in the rotation force applying member 52. The oil delivery passage 61 is configured to deliver the lubricating oil from the space C to the outside of the space C and guide the lubricating oil toward the oil inlet port 60a of the oil tank 60.

The oil delivery passage 62 functions as an oil passage that extends from the space C', formed between the input member 51 and the rotation force applying member 52, to the oil tank 60, and is formed in the rotation force applying member 52 in parallel with the oil delivery passage 61. The oil delivery passage 62 is configured to deliver the lubricating oil from the space C' to the outside of the space C' and guide the lubricating oil toward the oil inlet port 60b of the oil tank 60.

The oil introduction passage 63 has the first oil introduction passage 630, the second oil introduction passage 631 and the third oil introduction passage 632. The oil introduction passage 63 functions as an oil passage that extends from the oil outlet ports 60c to 60e of the oil tank 60 to the ball bearings 54, 56 and the oil supply passage 64. The oil introduction passage 63 is formed in the housing 2 (the rotation force applying member 52), the input members 50, 51 and the motor shaft 42.

The first oil introduction passage 630 has, for example, two oil flow passages 630a, 630b, and is formed in the rotation force applying member 52 and the input member 50. The oil flow passage 630a is formed in the rotation force applying member 52, and the oil flow passage 630b is formed in the input member 50. The first oil introduction passage 630 is configured to introduce the lubricating oil, delivered from the oil outlet port 60c of the oil tank 60, to the ball bearing 54.

The second oil introduction passage 631 has, for example, two oil flow passages 631a, 631b, and is formed in the third housing element 22 with a portion thereof (the oil flow passage 631a) exposed on the outside of the housing 2. The oil flow passage 631a is arranged outside the third housing element 22 in the form of, for example, a tube, and the oil flow passage 631b is formed in the third housing element 22. The second oil introduction passage 631 is configured to introduce the lubricating oil, delivered from the oil outlet port 60d of the oil tank 60, to the oil supply passage 64.

The third oil introduction passage 632 has, for example, two oil flow passages 632a, 632b, and is formed in the rotation force applying member 52 and the input member 51. The oil flow passage 632a is formed in the rotation force applying member 52, and the oil flow passage 632b is formed in the input member 51. The third oil introduction passage 632 is configured to introduce the lubricating oil, delivered from the oil outlet port 60e of the oil tank 60, to the ball bearing 56.

As shown in FIG. 4, the oil supply passage 64 has, for example, oil flow passages 64a to 64c. The oil supply passage 64 functions as an oil passage that extends from the second oil introduction passage 631 to the ball bearings 54, 56, and is formed in the motor shaft 42. The oil flow passage 64a communicates with the groove 42c of the motor shaft 42 and functions as an oil passage that extends from the second oil introduction passage 631 to the oil flow passages 64b, 64c. The oil flow passage 64b functions as an oil passage that extends from the oil flow passage 64a to the ball bearing 54. The oil flow passage 64c functions as an oil passage that extends from the oil flow passage 64a to the ball bearing 56. The oil supply passage 64 is configured such that the lubricating oil, introduced from the second oil introduction passage 631 into the oil flow passage 64a, is delivered to the oil flow passages 64b, 64c by centrifugal force generated in accordance with the rotation of the motor shaft 42, and the lubricating oil is supplied from the oil flow passage 64b to the ball bearing 54 and from the oil flow passage 64c to the ball bearing 56.

The oil supply passage 65 has, for example, oil flow passages 65a, 65b. The oil supply passage 65 functions as an oil passage that extends from the oil outlet port 60f of the oil tank 60 to the rear differential 3. The oil supply passage 65 is formed in the first housing element 20 with a portion thereof (the oil flow passage 65a) exposed on the outside of the housing 2. The oil flow passage 65a is arranged outside the first housing element 20 in the form of, for example, a tube, and the oil flow passage 65b is formed in the first housing element 20. The oil supply passage 65 is configured to supply the lubricating oil, delivered from the oil outlet port 60f of the oil tank 60, to the rear differential 3.

Next, the operation of the motor torque transmission device according to the present embodiment will be described with reference to FIG. 1 to FIG. 3. Referring to FIG. 2, when electric power is supplied to the electric motor 4 of the motor torque transmission device 1 to drive the electric motor 4, the motor torque of the electric motor 4 is applied to the reduction-transmission mechanism 5 via the motor shaft 42. Thus, the reduction-transmission mechanism 5 is driven.

Therefore, in the reduction-transmission mechanism 5, the input members 50, 51 each make circular motion with the eccentric amount $\delta$, for example, in the direction of the arrow $m_1$ shown in FIG. 3.

Accordingly, the input member 50 rotates about the axis $O_1$ (in the direction of the arrow $n_1$ shown in FIG. 3) while the external teeth 50c are meshed with the internal teeth 52c of the rotation force applying member 52, and the input member 51 rotates about the axis $O_2$ (in the direction of the arrow $1_1$ shown in FIG. 3) while the external teeth 51c are meshed with the internal teeth 52c of the rotation force applying member 52. In this case, due to the rotation of the input members 50, 51, the inner peripheries, which define the pin insertion holes 50b, contact the races 550 of the corresponding needle roller bearings 55, and the inner peripheries, which define the pin insertion holes 51b, contact the races 570 of the corresponding needle roller bearings 57.

Therefore, the revolving motions of the input members 50, 51 are not transmitted to the output members 53 and only the rotation motions of the input members 50, 51 are transmitted to the output members 53. Rotation force resulting from the rotation motions is output from the output members 53 to the differential case 30 as the torque of the differential case 30.

Thus, the rear differential 3 is driven, and driving force based on the motor torque of the electric motor 4 is distributed to the rear axle shafts 106 shown in FIG. 1 and transmitted to the right and left rear wheels 105.

In the motor torque transmission device 1, when the input members 50, 51 make circular motions about the rotation axis O in accordance with the rotation of the electric motor 4 (the motor shaft 42), pumping action based on the circular motion occurs between the input members 50, 51 and the rotation force applying member 52.

Accordingly, the lubricating oil is delivered from the space C, formed between the input member 50 and the rotation force applying member 52, to the oil delivery passage 61, and further introduced from the oil delivery passage 61 to the oil tank 60 via the oil inlet port 60a. Similarly, the lubricating oil is introduced from the space C', formed between the input member 51 and the rotation force applying member 52, into the oil delivery passage 62, and further introduced from the oil delivery passage 62 to the oil tank 60 via the oil inlet port 60b.

In this case, part of the lubricating oil in the housing 2 is stored in the oil tank 60. Therefore, it is possible to suppress an increase in torque loss due to agitation of the lubricating oil in the housing 2 during operation of the speed reduction unit A.

Then, the lubricating oil in the oil tank 60 is delivered from the oil outlet port 60c to the first oil introduction passage 630 of the oil introduction passage 63, and from the oil outlet port

60e to the third oil delivery passage 632. The lubricating oil in the oil tank 60 is supplied through the first oil introduction passage 630 to the ball bearing 54 and through the third oil introduction passage 632 to the ball bearing 56.

In this case, when the input member 50 is arranged at a position at which the lubricating oil drops from the oil flow passage 630a of the first oil introduction passage 630 to the oil flow passage 630b of the first oil introduction passage 630, that is, at a position at which the oil flow passage 630a and the oil flow passage 630b of the first oil introduction passage 630 meet each other, the lubricating oil flows through the oil flow passage 630a and the oil flow passage 630b and then reaches the ball bearing 54.

Similarly, when the input member 51 is arranged at a position at which the lubricating oil drops from the oil flow passage 632a of the third oil introduction passage 632 to the oil flow passage 632b of the third oil introduction passage 632, that is, at a position at which the oil flow passage 632a and the oil flow passage 632b of the third oil introduction passage 632 meet each other, the lubricating oil flows through the oil flow passage 632a and the oil flow passage 632b and then reaches the ball bearing 54.

In addition, the lubricating oil in the oil tank 60 is introduced from the oil outlet port 60d to the second oil introduction passage 631 (the oil flow passages 631a, 631b) of the oil introduction passage 63. The lubricating oil in the oil tank 60 is supplied from the oil flow passages 631a, 631b to the ball bearing 54 via the inside of the motor shaft 42 (the oil flow passage 64a and the groove 42c) and the oil flow passage 64b, and to the ball bearing 56 via the oil flow passage 64a, the groove 42c and the oil flow passage 64c.

In this case, the lubricating oil falls through the oil flow passages 631a, 631b from the oil outlet port 60d of the oil tank 60 and then reaches the inside of the motor shaft 42. After that, the lubricating oil flows through the oil flow passage 64a (the inside of the motor shaft 42), because the inner periphery of the motor shaft 42 has the spiral groove 42c through which the lubricating oil is supplied from the opening portion on the oil flow passage 631b-side (right side in FIG. 2) to the opening portion on the oil flow passages 64b, 64c-side (left side in FIG. 2) in accordance with the rotation of the motor shaft 42. Furthermore, because centrifugal force generated in accordance with the rotation of the motor shaft 42 acts on the lubricating oil in the oil flow passage 64a, the lubricating oil in the oil flow passage 64a flows through the oil flow passage 64b and then reaches the ball bearing 54 and flows through the oil flow passage 64c and then reaches the ball bearing 56.

Therefore, the lubricating oil is not concentrated on the outer side in the radial direction of the motor shaft 42 despite centrifugal force generated in accordance with the circular motions (revolving motions) of the input members 50, 51. Therefore, it is possible to increase the amount of lubricating oil on the inner side in the radial direction perpendicular to the rotation axis O.

Note that, in the above embodiment, the case where the input members 50, 51 are caused to make circular motions in the direction of the arrow $m_1$ to drive the motor torque transmission device 1 is described. Alternatively, the motor torque transmission device 1 may be driven as in the case of the above embodiment even when the input members 50, 51 are caused to make circular motions in the direction of the arrow $m_2$. In this case, the rotation motion of the input member 50 is made in the direction of the arrow $n_2$, and the rotation motion of the input member 51 is made in the direction of the arrow $l_2$.

According to the above described embodiment, the following advantageous effects are obtained.

The amount of lubricating oil on the inner side in the radial direction perpendicular to the rotation axis O is increased. Therefore, it is possible to sufficiently supply the lubricating oil to the ball bearings 54, 56 located near the rotation axis O.

As described above, the speed reduction mechanism according to the invention and the motor torque transmission device that includes the speed reduction mechanism are described on the basis of the above embodiment. However, the invention is not limited to the above embodiment. The invention may be implemented in various forms without departing from the scope of the invention, and, for example, the invention may be implemented in the following alternative embodiments.

(1) In the above embodiment, the eccentric portion 42a and the eccentric portion 42b are arranged on the outer periphery of the motor shaft 42 such that the distance from the axis $O_1$ of the center hole 50a to the rotation axis O and the distance from the axis $O_2$ of the center hole 51a to the rotation axis O are equal to each other and the distance between the axis $O_1$ of the center hole 50a and the axis $O_2$ of the center hole 51a in one of the circumferential directions around the rotation axis O and the distance between the axis $O_2$ of the center hole 51a and the axis $O_1$ of the center hole 50a in the other circumferential direction around the rotation axis O are equal to each other. The above description is made on the case where the input members 50, 51 are arranged on the portions that are formed on the motor shaft 42 of the electric motor 4 so as to be apart from each other in the circumferential direction around the axis of the motor shaft 42 (rotation axis O) at equal intervals (180°). However, the invention is not limited to this configuration, and the number of the input members may be changed as needed.

That is, when the number of the input members is n (n 3), the axis of the first eccentric portion, the axis of the second eccentric portion, ..., and the axis of the nth eccentric portion are successively arranged in one direction about the axis of the motor shaft in an imaginary plane perpendicular to the axis of the electric motor (motor shaft). Then, the eccentric portions are arranged around the motor shaft such that the distance from the axis of each eccentric portion to the axis of the motor shaft is equal to one another and an angle formed between line segments that connect the axis of the motor shaft to the respective axes of any adjacent two eccentric portions among the first eccentric portion, the second eccentric portion, ..., and the nth eccentric portion is set to 360°/n. Furthermore, the n input members are arranged on the motor shaft at portions that are spaced at intervals of 360°/n about the axis of the motor shaft.

For example, when the number of the input members is three, the axis of the first eccentric portion, the axis of the second eccentric portion and the axis of the third eccentric portion are successively arranged in one direction around the axis of the motor shaft in an imaginary plane perpendicular to the axis of the motor shaft. The eccentric portions are arranged around the motor shaft such that the distance from the axis of each eccentric portion to the axis of the motor shaft is equal to one another and an angle formed between line segments that connect the axis of the motor shaft to the respective axes of any adjacent two eccentric portions among the first eccentric portion, the second eccentric portion and the third eccentric portion is set to 120°. Furthermore, the three input members are arranged on the motor shaft at portions that are spaced at intervals of 120° about the axis of the motor shaft.

(2) In the above embodiment, the case where the invention is applied to the four-wheel drive vehicle 101 that uses both the engine 102 and the electric motor 4 as the driving sources is described. However, the invention is not limited to this configuration. The invention may also be applied to an electric vehicle, which is a four-wheel drive vehicle or a two-wheel drive vehicle, using only an electric motor as a driving source. In addition, the invention may also be applied to a four-wheel drive vehicle that has a first drive shaft driven by an engine and an electric motor and a second drive shaft driven by an electric motor, as in the case of the above embodiment.

(3) In the above embodiment, the description is made on the case where the ball bearings 54, 56, which are deep groove ball bearings, are used as first bearings and provided between the inner peripheries, which define the center holes 50*a*, 51*a* of the input members 50, 51, and the outer peripheries of the eccentric portions 42*a*, 42*b* such that the input members 50, 51 are rotatably supported on the eccentric portions 42*a*, 42*b*. However, the invention is not limited to this configuration. Ball bearings other than deep groove ball bearings or roller bearings may be used as first bearings, instead of the deep groove ball bearings. Such a ball bearing or a roller bearing may be, for example, an angular contact ball bearing, a needle roller bearing, a long cylindrical roller bearing, a cylindrical roller bearing, a tapered roller bearing, a spherical roller bearing, or the like. In addition, the first bearing according to the invention may be a plain bearing instead of a rolling bearing.

(4) In the above embodiment, the description is made on the case where the needle roller bearing 55 that serves as the second bearing and that is able to contact the inner periphery, which defines a corresponding one of the pin insertion holes 50*b* of the input member 50, is fitted to the outer periphery of each of the output members 53 at a portion between the threaded portion 53*a* and the head 53*b*, and the needle roller bearing 57 that serves as the second bearing and that is able to contact the inner periphery, which defines a corresponding one of the pin insertion holes 51*b* of the input member 51, is fitted to the outer periphery of each of the output members 53 at a portion between the threaded portion 53*a* and the head 53*b*. However, the invention is not limited to this configuration. A roller bearing other than a needle roller bearing or a ball bearing may be used instead of the needle roller bearing. Such a ball bearing or a roller bearing may be, for example, a deep groove ball bearing, an angular contact ball bearing, a cylindrical roller bearing, a long cylindrical roller bearing, a tapered roller bearing, a spherical roller bearing, or the like. In addition, the second bearing according to the invention may be a plain bearing instead of a rolling bearing.

(5) In the above embodiment, the case where rotation force is applied to the input members 50, 51 through mesh between the external teeth 50*c*, 51*c* and the internal teeth 52*c* is described. The invention is not limited to this configuration. As is described in JP 2007-218407 A, rotation force may be applied to the input members through engagement between curved waveform portions of curved plates (revolving members), which serve as the input members, and outer pins.

According to the invention, it is possible to increase the amount of lubricating oil on the inner side in the radial direction perpendicular to the rotation axis, and it is possible to sufficiently supply the lubricating oil to the bearings near the rotation axis.

What is claimed is:

1. A speed reduction mechanism, comprising:
  a speed reduction unit that includes an input member formed of an external gear that makes circular motion about a rotation axis with a predetermined eccentric amount, and a rotation force applying member formed of an internal gear that has teeth the number of which is larger than the number of teeth of the input member and that is in mesh with the input member; and
  a lubricating oil supply unit that supplies lubricating oil to a bearing of the speed reduction unit, wherein the bearing of the speed reduction unit is radially inward of the input member, and wherein
  the lubricating oil supply unit includes an oil tank arranged outside of the rotation force applying member, an oil delivery passage that delivers the lubricating oil from a space formed between the input member and the rotation force applying member to the oil tank, and a first oil introduction passage that introduces the lubricating oil from the oil tank to the bearing, and
  the lubricating oil is delivered from the space to the oil delivery passage through pumping action of the input member based on the circular motion.

2. A motor torque transmission device, comprising:
  an electric motor that generates motor torque; and
  a reduction-transmission mechanism that reduces a speed of rotation output from the electric motor, and that transmits driving force to a driving force transmission target, wherein
  the reduction-transmission mechanism is the speed reduction mechanism according to claim 1.

3. A motor torque transmission device comprising:
  an electric motor that generates motor torque; and
  a speed reduction mechanism that reduces a speed of rotation output from the electric motor and that transmits a driving force to a driving force transmission target, wherein the speed reduction mechanism comprises
    a speed reduction unit including an input member formed of an external gear that makes circular motion about a rotation axis with a predetermined eccentric amount, and a rotation force applying member formed of an internal gear that has teeth the number of which is larger than the number of teeth of the input member and that is in mesh with the input member; and
    a lubricating oil supply unit that supplies lubricating oil to a bearing of the speed reduction unit, wherein
    the lubricating oil supply unit includes an oil tank arranged outside of the rotation force applying member, an oil delivery passage that delivers the lubricating oil from a space formed between the input member and the rotation force applying member to the oil tank, and a first oil introduction passage that introduces the lubricating oil from the oil tank to the bearing, and
    the lubricating oil is delivered from the space to the oil delivery passage through pumping action of the input member based on the circular motion, wherein:
  the electric motor has a motor shaft and an eccentric portion is provided on the motor shaft, the eccentric portion having an axis that is offset from an axis of the motor shaft; and
  in the speed reduction mechanism, the lubricating oil supply unit supplies the lubricating oil to an input-side bearing which serves as the bearing and via which the input member is rotatably supported by the eccentric portion.

4. The motor torque transmission device according to claim 3, wherein
  in the speed reduction mechanism, the lubricating oil supply unit has a bearing-side oil supply passage in the motor shaft, the bearing-side oil supply passage extending from the oil tank to the input-side bearing via a second oil introduction passage that is different from the first oil introduction passage, and the lubricating oil is supplied from the bearing-side oil supply passage to the input-side bearing by centrifugal force generated in accordance with rotation of the motor shaft.

5. The motor torque transmission device according to claim 3, wherein
in the speed reduction mechanism, the lubricating oil supply unit has a differential mechanism-side oil supply passage that extends from the oil tank to a differential mechanism that is the driving force transmission target.

6. The motor torque transmission device according to claim 4, wherein
in the speed reduction mechanism, the lubricating oil supply unit has a differential mechanism-side oil supply passage that extends from the oil tank to a differential mechanism that is the driving force transmission target.

* * * * *